May 25, 1948.  W. T. SCHWARZHOFF  2,442,023
VEHICLE CHOCK
Filed Aug. 14, 1946  2 Sheets-Sheet 1
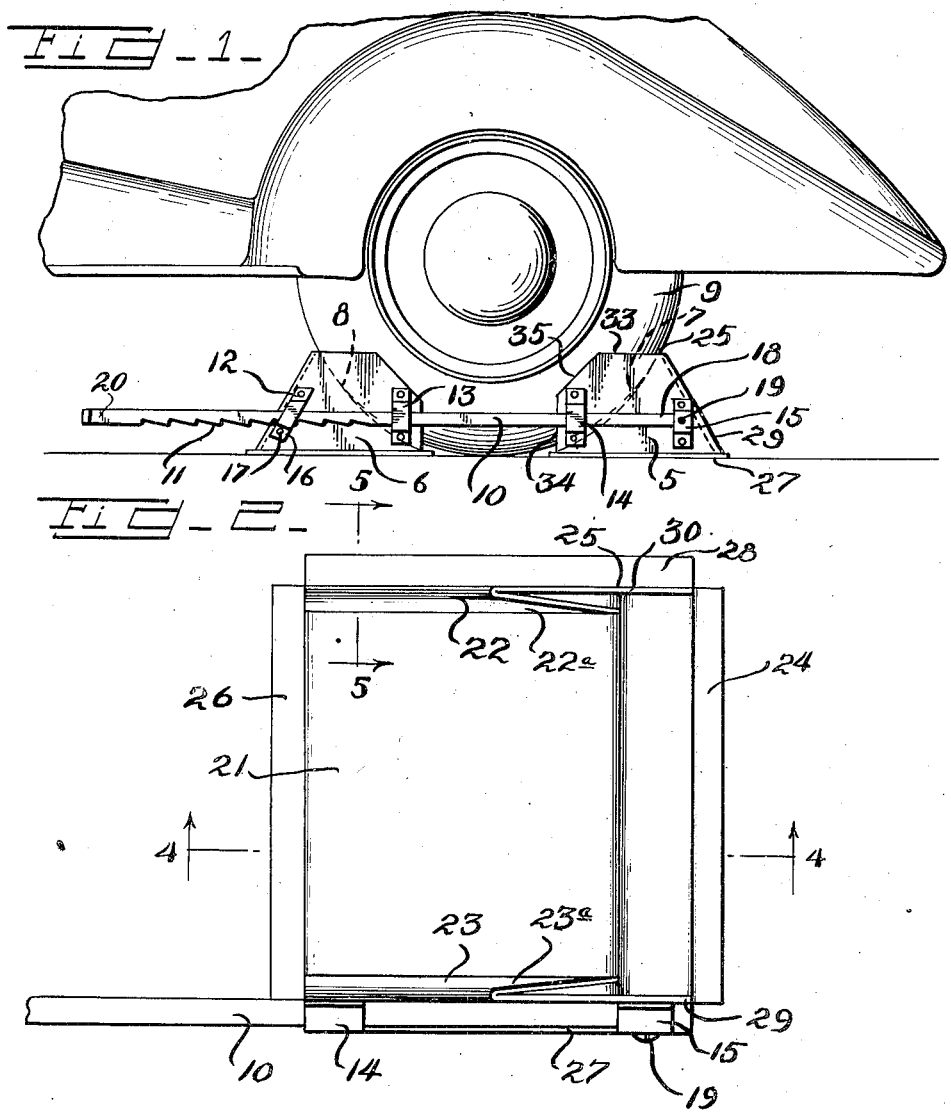
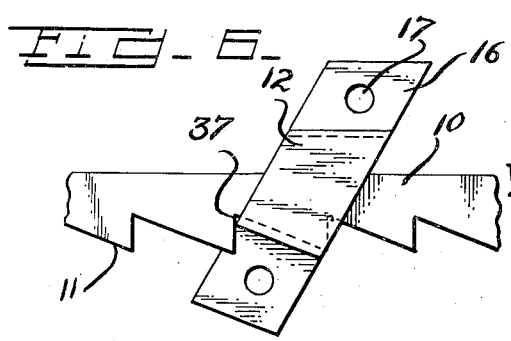
Inventor
William T. Schwarzhoff
By Clarence A. O'Brien
and Harvey B. Jackson
Attorneys

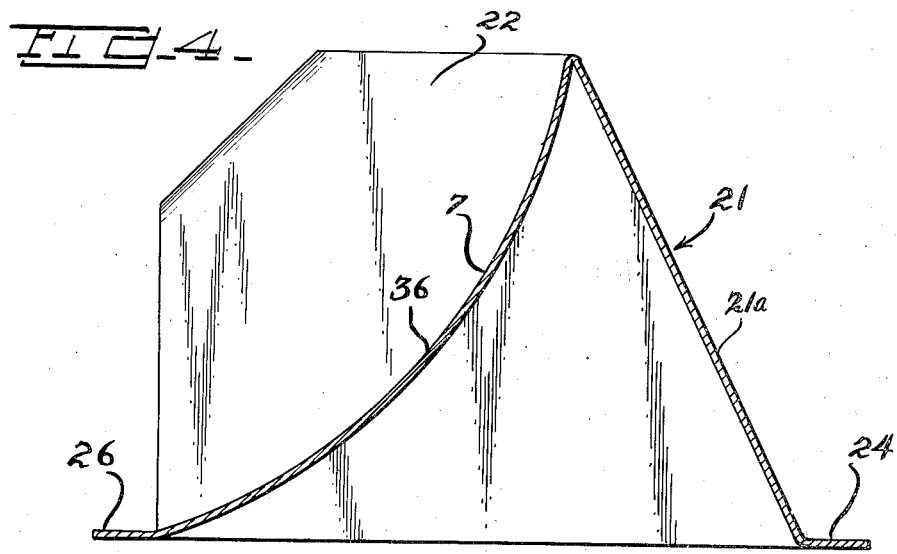
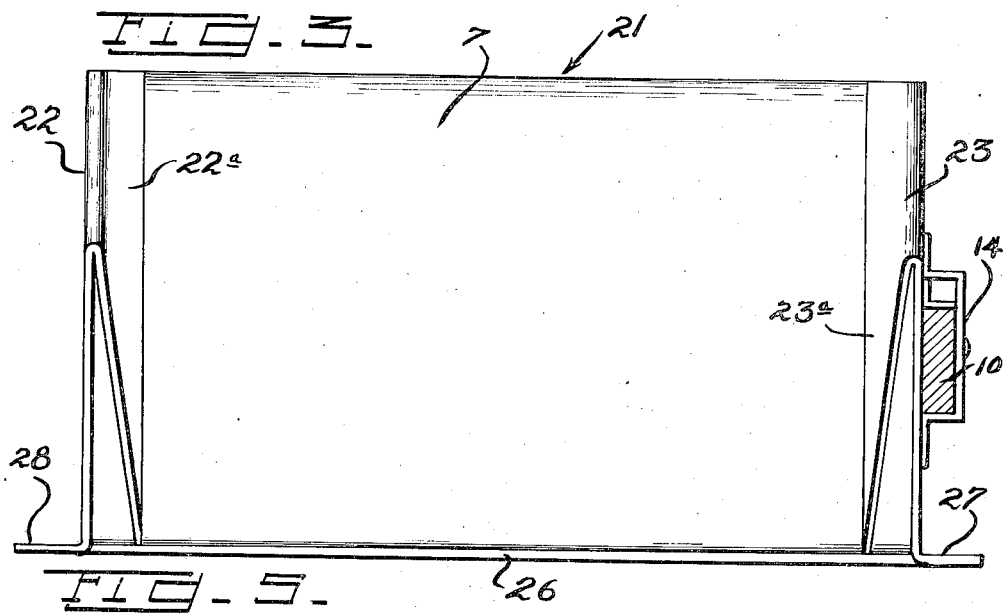
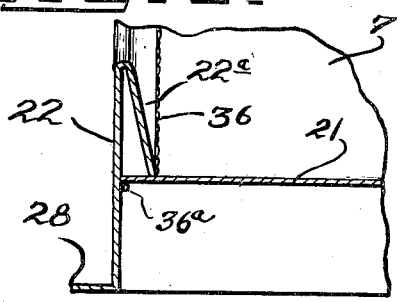

Patented May 25, 1948

2,442,023

UNITED STATES PATENT OFFICE 2,442,023

VEHICLE CHOCK

William T. Schwarzhoff, Waukon, Iowa

Application August 14, 1946, Serial No. 690,409

1 Claim. (Cl. 188—32)

The present invention relates to new and useful improvements in vehicle chocks and has for its primary object to provide an inexpensive, durable and easily operated device whereby the wheels of a vehicle will be held against movement while one of the wheels is jacked up.

An important object of the present invention is to provide a pair of front and rear chocking blocks constructed of sheet metal and in which the parts are welded together.

A further object of the invention is to provide a single locking bar connecting the chocking blocks on the outer sides of the latter whereby to enable the easy adjustment of the blocks by the operator.

Another object of the invention is to provide a device of this character of simple and practical construction, which may be manufactured at relatively low cost and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the invention in use;

Figure 2 is an enlarged top plan view of one of the chocking blocks;

Figure 3 is a front elevational view of one of the blocks with the locking bar shown in section;

Figure 4 is a sectional view taken on a line 4—4 of Figure 2;

Figure 5 is a fragmentary sectional view taken on a line 5—5 of Figure 3, and

Figure 6 is a fragmentary side elevational view of the adjusting bar and the locking guide therefor.

Referring now to the drawing in detail wherein for the purpose of illustration I have disclosed a preferred embodiment of the invention the device consists essentially of two sheet metal blocks 5 and 6 adapted for positioning respectively at the front and rear of a vehicle tire 9 and having opposed curved surfaces 7 and 8 to conform to the curvature of the tire. The blocks are adjustably connected to each other by an iron locking bar 10 having notches or teeth 11 formed in the lower edge thereof.

The locking bar 10 is seated in four channel shaped guides 12, 13, 14 and 15 having flanges 16 turned outwardly for attaching to the outer sides of the blocks 5 and 6 by rivets or pins 17. The rear end 18 of the locking bar 10 is pivoted into channel 15 by a rivet or pin 19 that extends through the channel and through the locking bar. The locking bar 10 is movable vertically in the other channel guides 12, 13 and 14.

The blocks 5 and 6 are adjustable relative to each other to accommodate any diameter vehicle tire 9 by merely raising the front end 20 of the locking bar until the proper space between the blocks 5 and 6 is obtained and then lowering the locking bar until the notches or teeth 11 engage the forwardmost channel 12 as is shown in Figure 6.

The wheel block 5 is made of three pieces of sheet metal 21, 22 and 23, the member 21 comprising a center section having a flange 24 turned outwardly at one end to rest on the ground, the center section then extending upwardly at a slight angle as shown at 21a to its uppermost point 25 where it is then curved downwardly as shown at 7 to conform to a vehicle tire 9, the curved portion of the center section terminating at its lower edge in a flange 26 which also rests on the ground.

The members 22 and 23 comprise side sections for the block having flanges 27 and 28 turned outwardly and having vertically inclined edges 29 and 30 corresponding to the slope 21a of the center piece.

Each side section also includes an upper horizontal edge 33 and a vertical edge 34. An inclined edge 35 joins the horizontal and vertical edges 33 and 34, inclined edge 35 being bent inwardly and downwardly and is so curved at its lower edge as to conform to the curvature of the center section 21 and is welded at 36 to the surface of the center section while the edges of the curved surface of the block are welded to the side sections as shown at 36a.

The block 6 is constructed in a similar manner to the construction of the block 5 but with the curved portion 8 of the center section placed in opposed relation with the curved portion 7 of the block 5.

The channel guide 12 at the free end of the locking bar 10 is slightly inclined on block 6 to provide a sloping edge 37 to insure a locking engagement by the teeth 11 of the locking bar.

The side walls 22 and 23 are formed with downwardly and inwardly bent extensions to provide inwardly sloping inner walls 22a and 23a respectively which frictionally engage the sides of the tire 9.

In operation, the metallic blocks 5 and 6 are placed in front of and behind a vehicle wheel as shown in Figure 1 with the curved surfaces 7 and 8 bearing against the tire and the locking bar 10 lowered to engage the teeth 11 with the sloping edge 37 of the channel guide 12. The device is detached by raising the free end of the locking bar to disengage the teeth 11 from the guide 12, thereby permitting the block 6 to slide on the bar away from the tire.

The block 6 may be completely removed from the locking bar to facilitate carrying and storing thereof.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

I claim:

A wheel chock comprising a center sheet of metal of substantially inverted V-form and including a curved surface adapted to conform to a vehicle wheel, a pair of side sheets of metal having an edge in the plane of the ends of the center sheet to rest on the ground, the side edges of the center sheet being welded to the inner surfaces of said side sheets, and an inwardly sloping inner wall extending downwardly from the upper edge of said side walls and also welded to said center sheet to frictionally grip the sides of a vehicle tire positioned against the curved surface of the block.

WILLIAM T. SCHWARZHOFF.

REFERENCES CITED

The following references are of record in the file of this patent:

UNITED STATES PATENTS

| Number | Name | Date |
|---|---|---|
| 472,997 | Hayward | Apr. 19, 1892 |
| 1,076,152 | Rode | Oct. 21, 1913 |
| 2,418,279 | Sax | Apr. 1, 1947 |

FOREIGN PATENTS

| Number | Country | Date |
|---|---|---|
| 675,784 | France | Feb. 14, 1930 |